(12) United States Patent
Hasegawa et al.

(10) Patent No.: US 7,641,015 B2
(45) Date of Patent: Jan. 5, 2010

(54) MOTORCYCLE

(75) Inventors: Yosuke Hasegawa, Wako (JP); Atsushi Mamiya, Atsugi (JP); Ryota Okamura, Atsugi (JP)

(73) Assignee: Honda Motor Co., Ltd., Tokyo (JP)

( * ) Notice: Subject to any disclaimer, the term of this patent is extended or adjusted under 35 U.S.C. 154(b) by 130 days.

(21) Appl. No.: 12/058,075

(22) Filed: Mar. 28, 2008

(65) Prior Publication Data

US 2008/0236925 A1    Oct. 2, 2008

(30) Foreign Application Priority Data

Mar. 30, 2007    (JP) .............................. 2007-094630
Mar. 30, 2007    (JP) .............................. 2007-094793

(51) Int. Cl.
  B62D 61/02    (2006.01)
  B62K 25/26    (2006.01)

(52) U.S. Cl. ....................... 180/219; 180/227; 180/226; 280/285

(58) Field of Classification Search ................. 180/219, 180/227
See application file for complete search history.

(56) References Cited

U.S. PATENT DOCUMENTS 3,917,313 A * 11/1975 Smith et al. ................. 280/284
4,058,181 A * 11/1977 Buell .......................... 180/227
4,433,747 A * 2/1984 Offenstadt ................... 180/227
4,463,824 A * 8/1984 Boyesen ...................... 180/227
4,815,555 A * 3/1989 Kishi et al. .................. 180/227
4,951,791 A * 8/1990 Belil Creixelli ............. 180/219
5,067,580 A * 11/1991 Parker ......................... 180/219
5,908,078 A * 6/1999 Belil Creixell .............. 180/219
6,516,910 B2 * 2/2003 Buell et al. .................. 180/219
2006/0033306 A1 * 2/2006 Sanchez ...................... 280/283
2008/0078602 A1 * 4/2008 Igarashi et al. .............. 180/227
2008/0230293 A1 * 9/2008 Igarashi et al. .............. 180/227
2008/0236923 A1 * 10/2008 Hasegawa et al. ........... 180/219

FOREIGN PATENT DOCUMENTS

JP    2002-087364    3/2002

* cited by examiner

*Primary Examiner*—Tony H Winner
*Assistant Examiner*—Wesley Potter
(74) *Attorney, Agent, or Firm*—Rankin, Hill & Clark LLP

(57) ABSTRACT

A motorcycle includes a rear swing arm which has upper and lower arms and an arm body. The upper and lower arms are vertically swingably attached to either a body frame or an engine via pivot shafts that are disposed in vertically spaced relation to each other and extend parallel to each other toward a rear wheel. The arm body is swingably connected to a rear end of the upper and lower arms via support shafts for supporting the rear wheel.

3 Claims, 11 Drawing Sheets

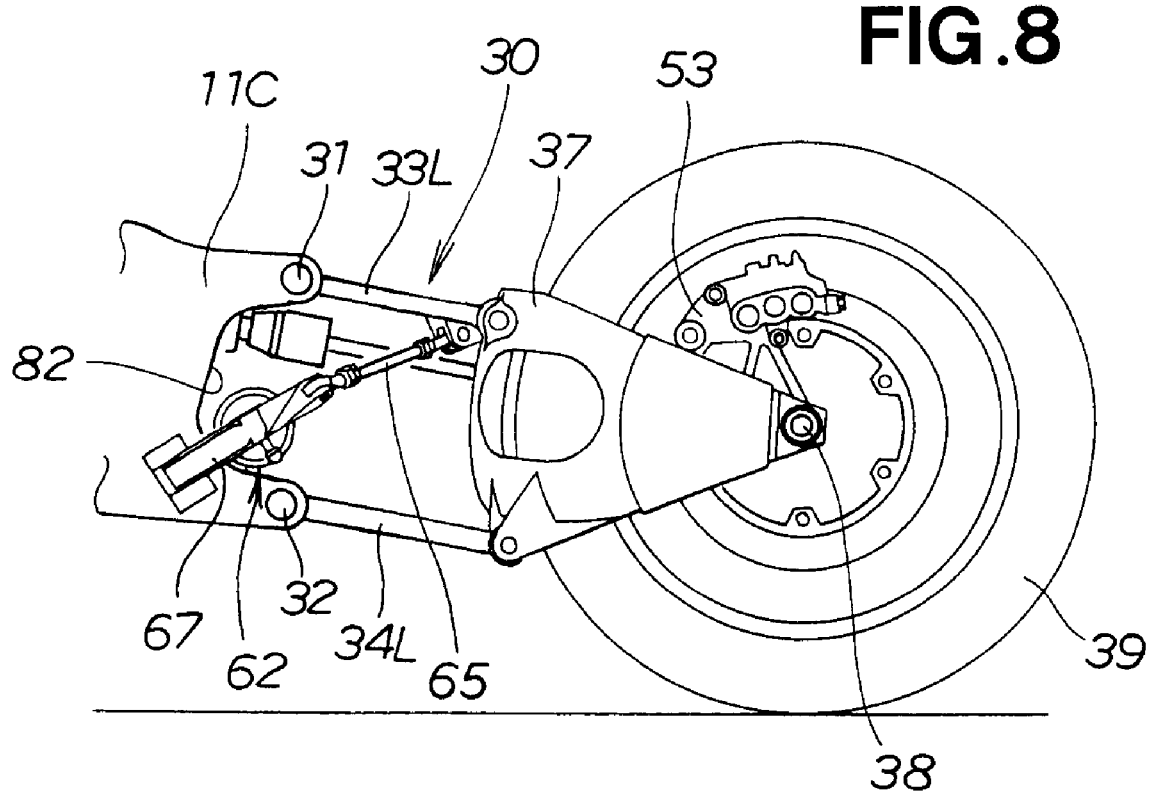

MOTORCYCLE

FIELD OF THE INVENTION

The present invention relates to a motorcycle having a rear swing arm provided on a rear part of a body of the motorcycle for supporting a rear wheel.

BACKGROUND OF THE INVENTION

A configuration of a motorcycle in which a rear swing arm is provided to a rear part of a motorcycle body is disclosed, e.g., in Japanese Patent Application Laid-Open Publication No. 2002-87364 (JP 2002-87364 A). The relationship between the rear swing arm and a brake caliper as disclosed in the above document will be described with reference to FIGS. 11A through 11C hereof.

As shown in FIG. 11A, a rear swing arm 103 is attached to a motorcycle body frame 101 via a pivot shaft 102. A rear wheel 104 is rotatably attached to a rear end of the rear swing arm 103. A brake disc 105 is integrally attached to the rear wheel 104. A caliper 106 is provided to a rear portion of the rear swing arm 103. The caliper 106 clamps the brake disc 105 and performs a braking function.

When the rear wheel 104 is not subjected to an upward force from a road surface, the rear swing arm 103 will extend downward at a slant from the pivot shaft 102. An angle βa is formed by a line Vc, which passes through a center of a rear wheel axle 107 and the caliper 106, and a line VL, which is plumb with the road surface.

As shown in FIG. 11B, when upward force from the road surface acts on the rear wheel 104, the rear wheel 104 will be raised a distance Sb from the initial position, and the rear swing arm 103 will extend from the pivot shaft 102 so as to be substantially parallel to the road surface. An angle βb formed by the line Vc and the line VL is greater than the angle βa.

As shown in FIG. 11C, when considerable upward force from the road surface acts on the rear wheel 104, the rear wheel 104 will be raised a distance Sc from the initial position, and the rear swing arm 103 will extend upward at a slant from the pivot shaft 102. An angle βc formed by the line Vc and the line VL is greater than the angle βb.

During braking, the rear swing arm 103 is subjected to braking force from the caliper 106. When the total of the braking force and the force received from the road surface acts on the rear swing arm 103, torsion and flexing occur in the rear swing arm 103 according to the total force.

The changing of the orientation of the caliper 106 relative to the road surface as indicated by the angles βa, βb, βc causes deformation to occur in the rear swing arm 103. This deformation may vary slightly from the predicted deformation.

As a result, the contact between the caliper 106 and the brake disc 105 (degree of contact) varies, and an abnormal noise known as "brake squeal" may occur. A need exists for a technique that can resolve these defects.

SUMMARY OF THE INVENTION

According to the present invention, there is provided a motorcycle comprising: a body frame; an engine carried on the body frame; a rear swing arm extending from one of the body frame and the engine; a rear wheel supported by the rear swing arm; and a drive mechanism for transmitting a drive force from the engine to the rear wheel. The rear swing arm comprises: upper arms and lower arms vertically swingably attached to one of the body frame and the engine via pivot shafts, the upper arms and lower arms extending toward the rear wheel and being parallel and in vertically spaced relation to each other; and an arm body swingably connected to a rear end of the upper and lower arms via support shafts for supporting the rear wheel, the arm body being in the form of a U shape as viewed in top plan and surrounding a front portion of the rear wheel.

The arm body that supports the rear wheel is connected to the motorcycle body frame or the engine via the upper arm and lower arm. The upper arm and lower arm are disposed in parallel to one another. Therefore, the arm body moves vertically in parallel to a line that is plumb with the road surface. The orientation of the caliper does not change because the caliper is provided to the arm body. As a result, the occurrence of brake squeal and other defects can be prevented.

Preferably, the drive mechanism has a drive shaft for transmitting a drive force to the rear wheel, and a reduction gear unit with a reduction gear case for covering the reduction gear unit. The gear case has an edge part attached to the arm body by a plurality of fastening member that extend in a width direction of the motorcycle. The reduction gear case is directly attached to the arm body. Force applied to the reduction gear case can be supported by the arm body. Specifically, the arm body performs a function for reinforcing the reduction gear case. As a result, the thickness and weight of the reduction gear case can be reduced, and the weight of the reduction gear unit can also be reduced.

Desirably, the arm body has an upper frame part and a lower frame part provided in vertically spaced relation to each other, while the reduction gear unit is disposed between the upper frame part and the lower frame part.

Placing the reduction gear unit between the upper and lower frame parts allows the reduction gear unit to be provided within the arm body. Even if the reduction gear unit protrudes from the arm body, as seen from above, the degree to which the unit protrudes can be reduced, the motorcycle can be prevented from being made wider, and the motorcycle can be made more compact.

The reduction gear case acts as a bridge for connecting the upper frame part and the lower frame part, and performs a reinforcement function whereby the upper frame part and the lower frame part are prevented from getting further apart, or coming closer to each other.

BRIEF DESCRIPTION OF THE DRAWINGS

Certain preferred embodiments of the present invention will be described in detail below, by way of example only, with reference to the accompanying drawings, in which:

FIG. 8 is a schematic view illustrating a layout of a rear cushioning unit;

DETAILED DESCRIPTION OF THE PREFERRED EMBODIMENTS

An overall structure of the motorcycle will be described now with reference to FIGS. 1 and 2.

Figure 1:
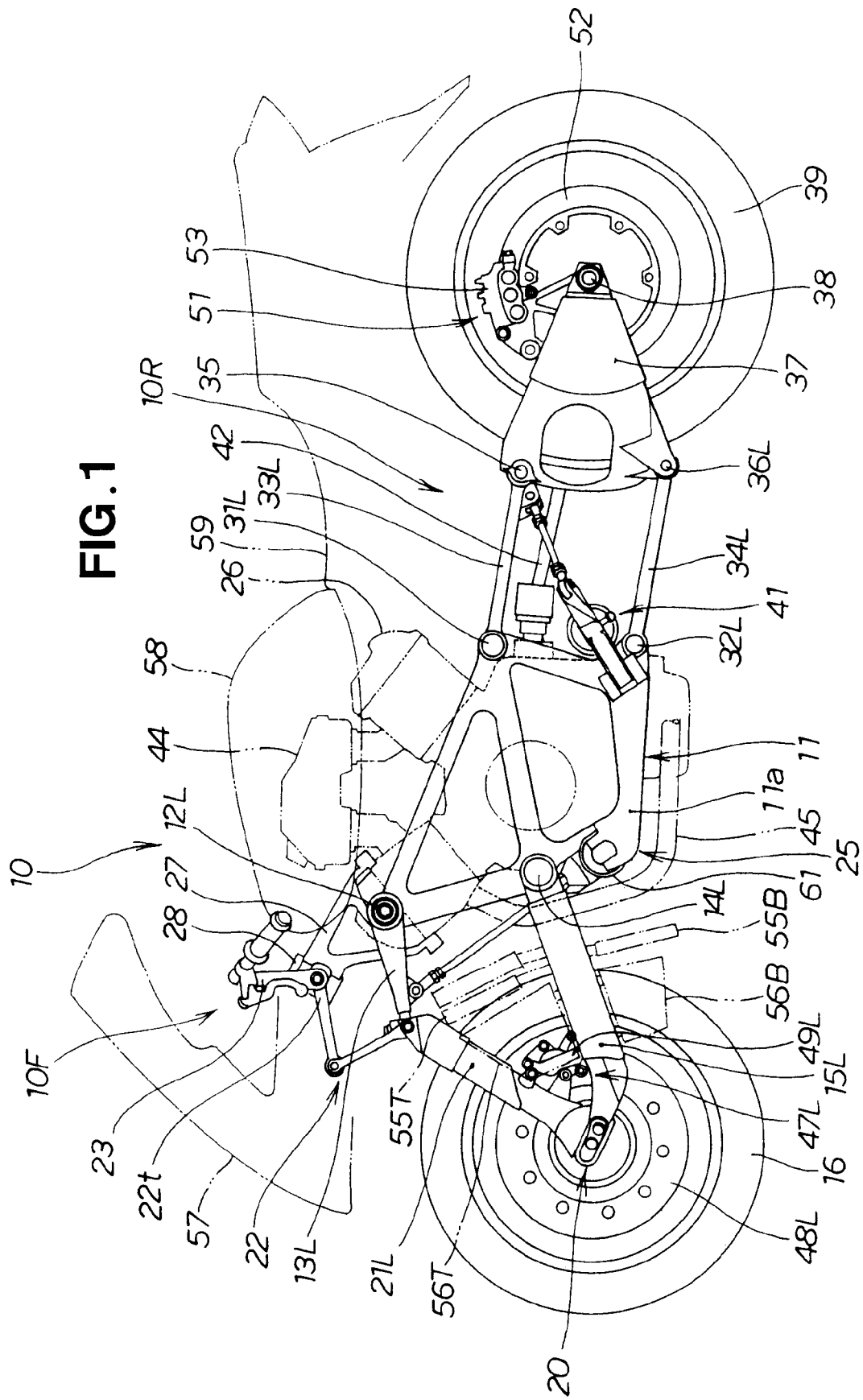
FIG. 1 is a left side elevational view showing a motorcycle according to the present invention.

As shown in FIG. 1, disposed in a front part 10F of a motorcycle 10 are main frames 11a as constituent elements of a motorcycle body frame 11; an upper arm 13L that extends forward from an upper part of the main frames 11a, and that is swingably supported in a vertical direction by a upper front pivot shaft 12L; and a lower arm 15L that extends forward from a lower part of the main frames 11a, and that is swingably supported in a vertical direction by a lower front swing shaft 14L so as to be capable of swinging in the vertical direction. The motorcycle further comprising a hub steering mechanism 20 that is provided to a distal end of the lower arm 15L, and that steerably supports a front wheel 16; a knuckle arm 21L that is provided above the hub steering mechanism 20, and that steerably supports the front wheel 16; a handle link 22 that is attached to an upper end part of the knuckle arm 21L, and that is capable of bending in a vertical direction; a steering handle 23 that is attached to an upper end part 22t of the handle link 22, and that is steered by a rider; and a front part cushioning mechanism 25 that is provided between the upper arm 13L and the main frames 11a, and that absorbs force applied to the front wheel 16.

Figure 2:
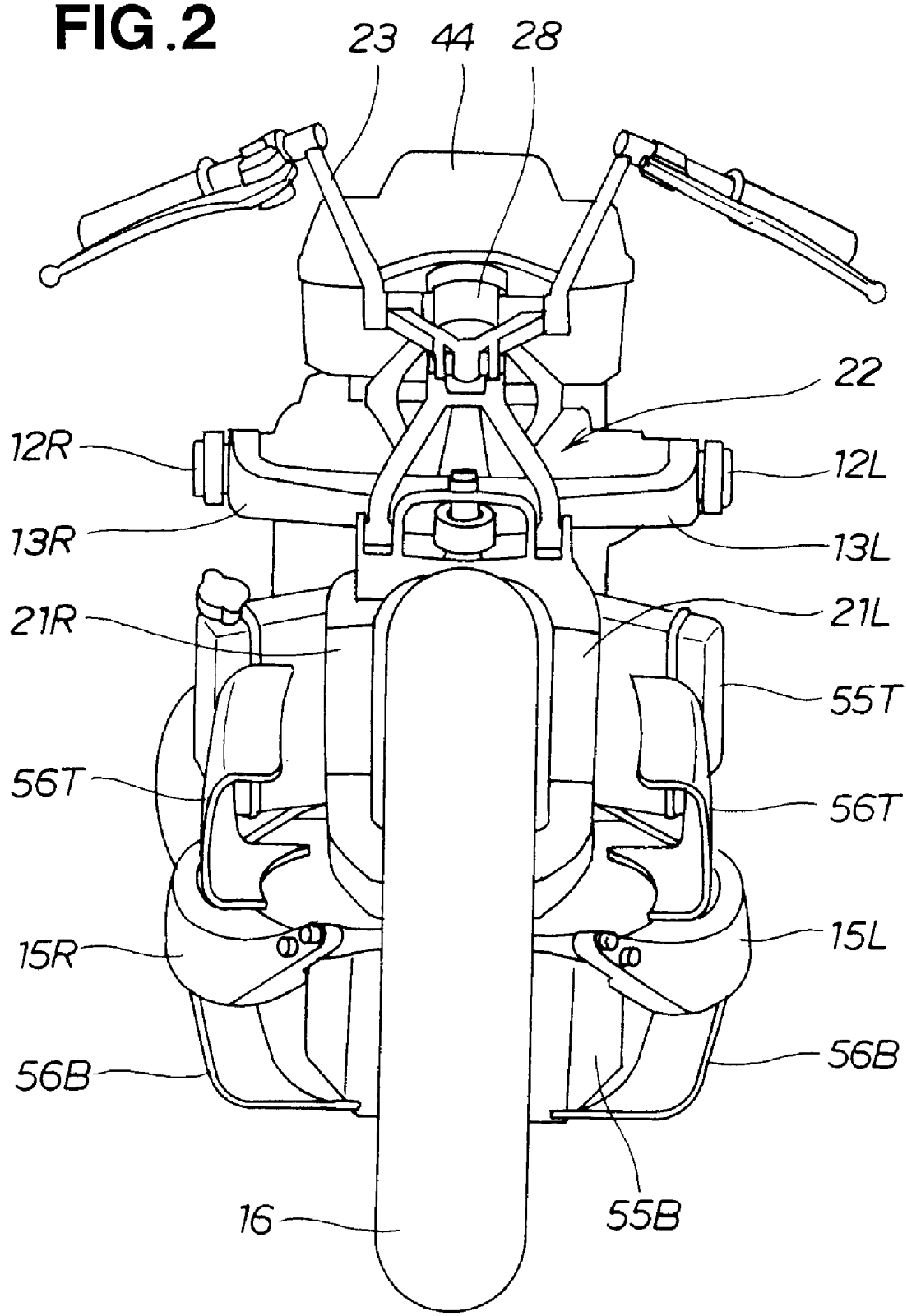
FIG. 2 is a front elevational view showing the motorcycle of FIG. 1.

As shown in FIG. 2, an upper front pivot shaft 12R is disposed so as to form a pair with the upper front pivot shaft 12L. An upper arm 13R, a lower arm 15R, and a knuckle arm 21R are similarly disposed.

As shown in FIG. 1, a handle support frame 27 extends forward from an engine 26. A head pipe 28 is attached to a front end part of the handle support frame 27, and a steering handle 23 is rotatably attached to the head pipe 28.

A handle link 22 is connected between the knuckle arm 21L and the steering handle 23, and the knuckle arm 21L is capable of moving in the vertical direction. Specifically, a force applied to the knuckle arm 21L is not directly transmitted to the steering handle 23 as a result of the handle link 22 being disposed therebetween. Accordingly, it is possible to reduce the weight of the handle support frame 27.

Disposed in a rear portion 10R of the motorcycle 10 are upper and lower arm members 33L, 34L that extend rearward from the main frames 11a, and that are connected to the main frames 11a by upper and lower pivot shafts 31L, 32L so as to be capable of swinging upward and downward; an arm member 37 that extends rearward from rear end parts of the upper and lower arm members 33L, 34L, and that is swingably connected by rear support shafts 35, 36L; a rear wheel 39 that is rotatably attached to a rear end part of the arm member 37 via a rear axle 38; and a rear cushioning mechanism 41 that is provided between the arm member 37 and the main frames 11a, and that absorbs force applied to the rear wheel 39.

The upper arm member 33L extends from an upper part of a rear end part of the main frames 11a, and the lower arm member 34L extends from a lower part of the rear end part of the main frames 11a.

The engine 26 is suspended on the main frames 11a as a drive source, and a driveshaft 42, which drives the rear wheel 39, extends from a rear end part of the engine 26.

The engine 26 is provided with an air cleaner 44 as a constituent element of an intake system; and an exhaust pipe 45 which is a constituent element of an exhaust system, and through which exhaust gas of the engine 26 passes.

A front disc brake 47L is attached to the front wheel 16. The front disc brake 47L comprises a front wheel brake disc 48L that is attached to the front wheel 16; and a front wheel disc caliper 49L that is attached to the knuckle arm 21L, and that clamps the front wheel brake disc 48L during braking.

A rear disc brake 51 is attached to the rear wheel 39. The rear disc brake 51 has a rear wheel brake disc 52 that is attached to the rear wheel 39; and a rear wheel disc caliper 53 that is attached to the arm member 37, and that sandwiches the rear wheel brake disc 52 during braking.

Two vertically disposed upper and lower radiators 55T, 55B for cooling the engine 26 are provided between the engine 26 and the front wheel 16. The upper radiator 55T is disposed between the upper arm 13L and the lower arm 15L. The lower radiator 55B is disposed below the lower arm 15L.

Upper and lower ducts 56T, 56B for guiding suctioned air to the radiators 55T, 55B are provided in front of the upper and lower radiators 55T, 55B. The upper and lower radiators 55T, 55B and the upper and lower ducts 56T, 56B are attached to the lower arm 15L. A front cowling 57 indicated by an imaginary line is disposed in front of the steering handle 23. A fuel tank 58 is disposed rearward of the steering handle 23. A seat 59 is disposed rearward of the fuel tank 58.

Specifically, the motorcycle body frame 11 and the front wheel 16 are connected by four arms; i.e., the upper arms 13L, 13R (see FIG. 2) and the lower arms 15L, 15R (see FIG. 2). Accordingly, a space can be maintained in front of the engine 26. Ensuring that this space is present allows the components to be disposed with a greater degree of latitude. For example, the upper and lower radiators 55T, 55B can be disposed in this space. The two radiators 55T, 55B enable adequately robust cooling performance to be demonstrated.

In the present embodiment, the engine 26 is a V-type engine 26 in which cylinders are disposed in a V-shape. However, the engine 26 may also be an in-line engine 26 in which cylinders are disposed in a row. The engine 26 is in a so-called transverse layout in which a crankshaft is disposed in a width direction of the motorcycle. However, the engine 26 may also have a so-called vertical layout in which the crankshaft is disposed in the longitudinal direction of the motorcycle. The engine 26 is not limited to being cooled by water, and may also be cooled by air. In other words, the type and layout of the engine 26 are not limited to the embodiments, and can be configured as required.

A front cushioning unit 61 for absorbing force is provided to the front cushioning mechanism 25. The exhaust pipe 45 through which exhaust gas of the engine 26 passes is disposed externally with respect to the front cushioning unit 61.

The exhaust pipe 45 through which exhaust gas of the engine 26 passes is disposed externally with respect to, or in front of, the front cushioning unit 61. The exhaust pipe 45 also serves to protect the expensive front cushioning unit 61.

The structure of the front part 10R of the motorcycle 10 will be described in detail below with reference to FIGS. 3 to 5.

Figure 3:
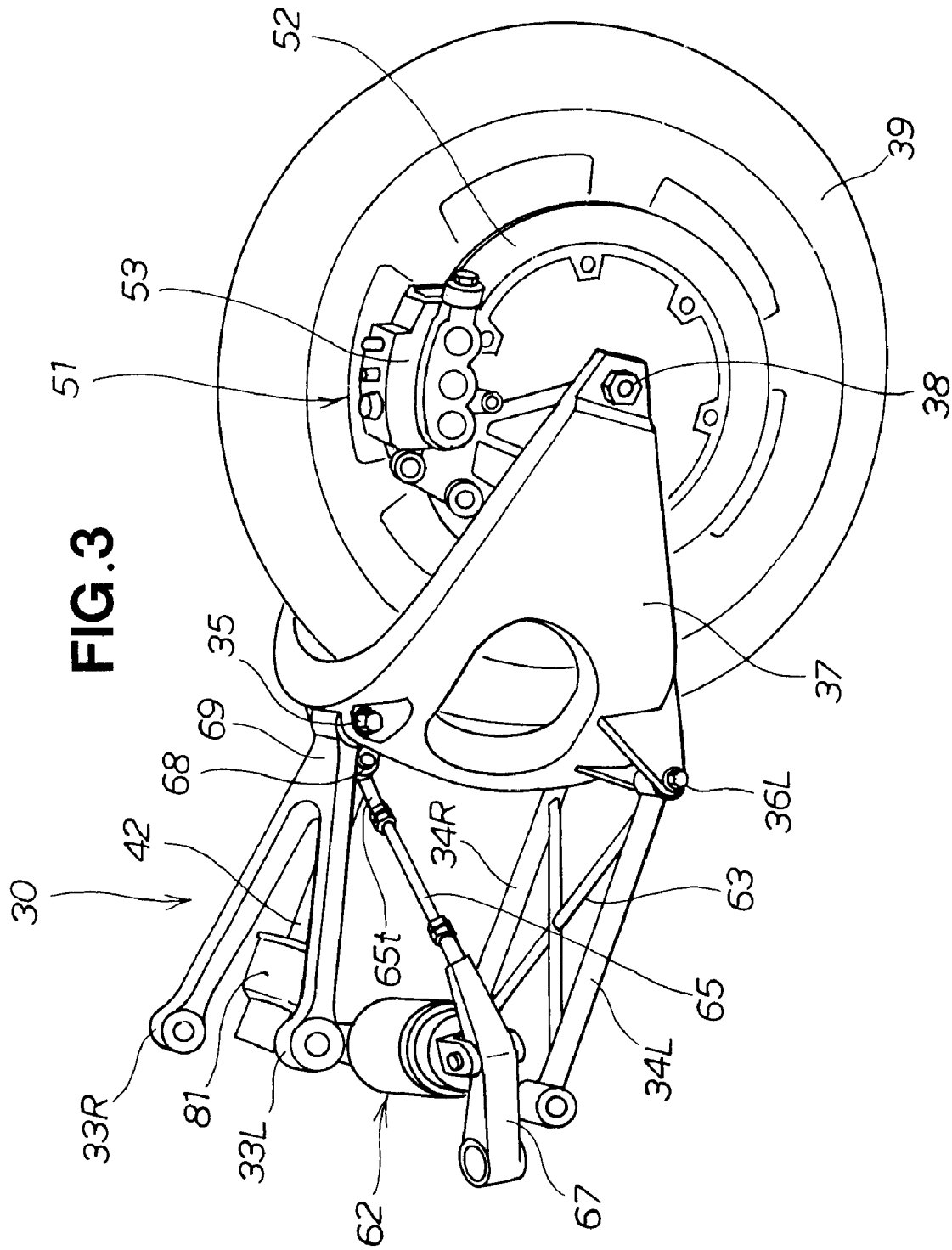
FIG. 3 is a perspective view showing a rear part of the motorcycle.

As shown in FIG. 3, a rear swing arm 30 provided to the rear part of the motorcycle has upper arms 33L, 33R and lower arms 34L, 34R that extend toward the rear wheel 39 and that are disposed in parallel to each other so as to be vertically separated. The swing arm also has the arm body 37 that is swingably connected to the rear ends of the upper arms 33L, 33R and the rear ends of the lower arms 34L, 34R via support shafts 35, 36L, 36R (see FIG. 5), that has a U shape as viewed from above (see FIG. 4) so as to surround a front half portion of the rear wheel 39, and that supports the rear wheel 39. A rear part cushioning unit 62 for absorbing force that is applied to the arm body 37 is provided between the upper arms 33L, 33R and the lower arms 34L, 34R.

The upper arms 33L, 33R are disposed to the left and right of the motorcycle, are connected at the rear ends, and form a substantial V shape, as seen when the motorcycle is viewed from above. The relative position of the upper arms 33L, 33R can be freely changed by changing the angle of the V shape. For example, the configuration formed by the upper arms 33L, 33R can be set according to the width of the seat 59.

As seen when the motorcycle 10 is viewed from above, the lower arms 34L, 34R are disposed in parallel to the left and the right of the motorcycle 10, and are connected by a substantially X-shaped cross part 63.

Providing the cross part 63 makes it possible to increase the rigidity of the lower arm 34L and the lower arm 34R.

Figure 4:
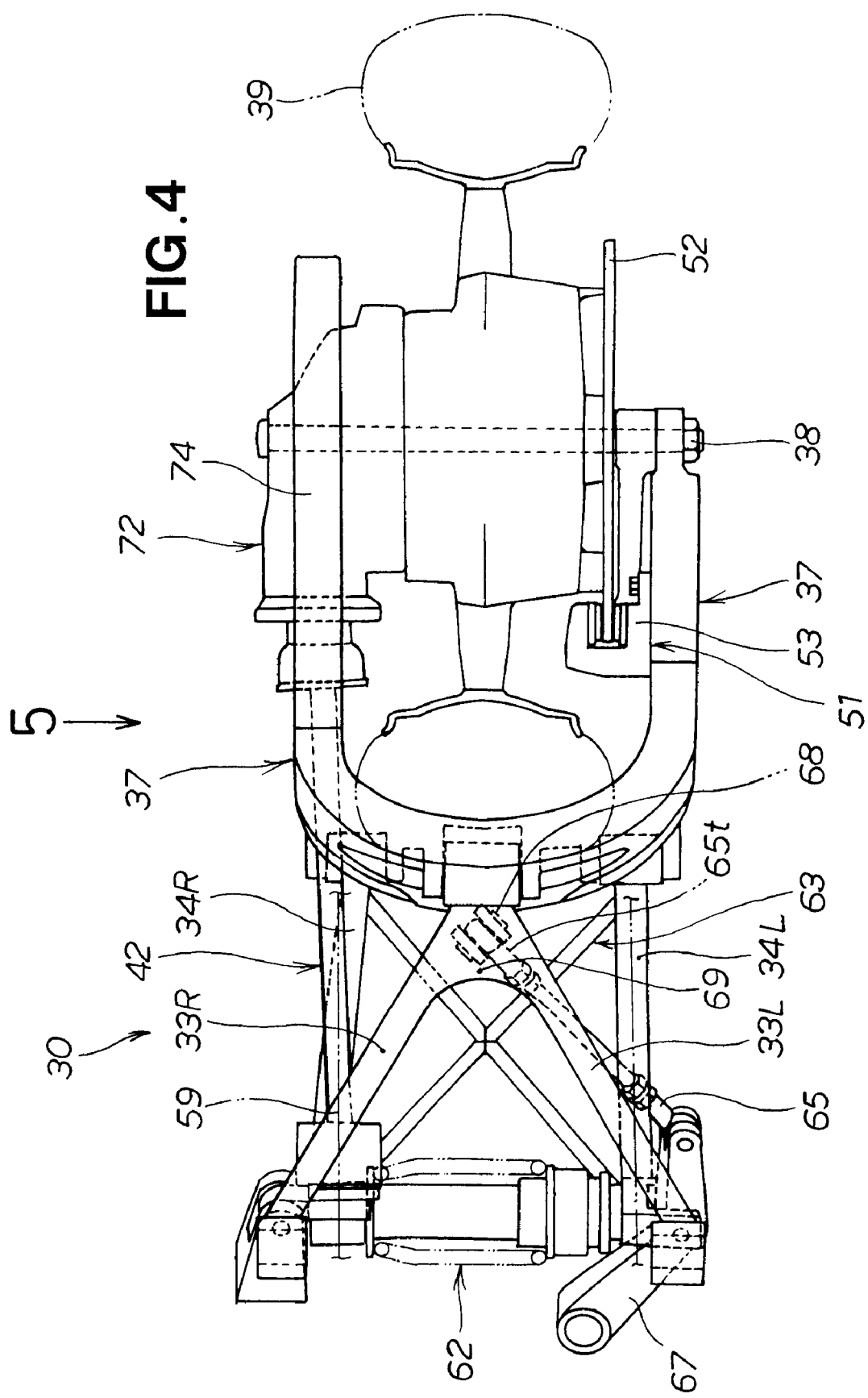
FIG. 4 is a top plan view showing the rear part of the motorcycle.

As shown in FIG. 4, the arm body 37 forms a substantial U shape that opens toward the rear, as seen when the motorcycle 10 is viewed from above. Force from the left and right can be absorbed in a balanced manner, and deformation in the arm body 37 can be reduced.

An upper end part 65t of a rod member 65 is connected to a connection point 69 of the upper arms 33L, 33R, which form a substantial V-shape.

Specifically, the connection point 69 is located in the center along the width direction of the motorcycle, a stay 68 is provided to the connection point 69, and the upper end part 65t of the rod member 65 is connected to the stay 68.

Accordingly, force transmitted from the rear wheel 39 to the arm body 37 is concentrated in the center of the motorcycle, and is transmitted to the rear part cushioning unit 62 via the stay 68 and the rod member 65.

Figure 5:
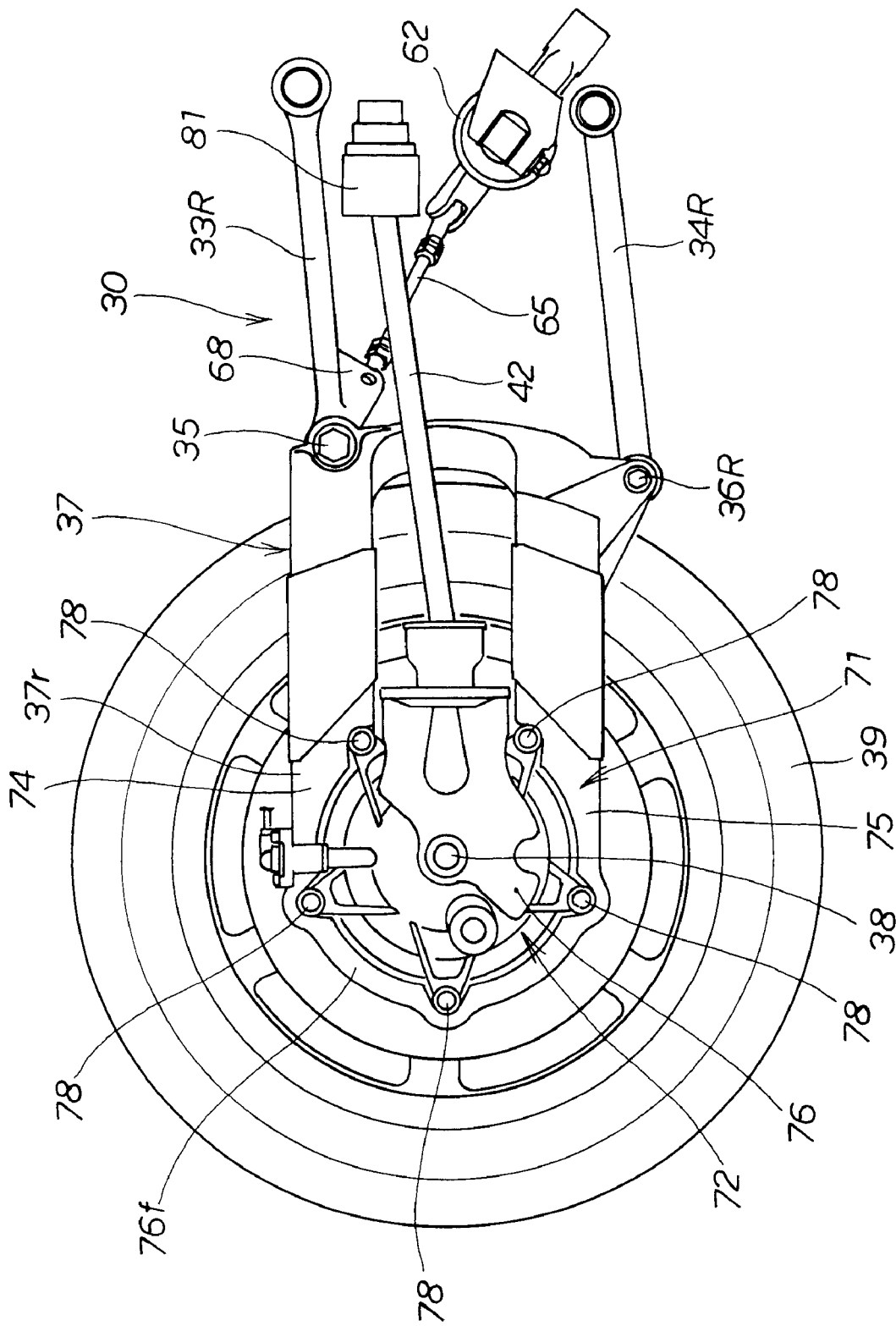
FIG. 5 is an enlarged view showing a part of the motorcycle as seen in the direction of arrow 5 of FIG. 3.

As shown in FIG. 5, a constant-velocity joint 81, the drive shaft 42 that extends from the constant-velocity joint 81, and a reduction gear unit 72 that is connected to the drive shaft 42 are included in a drive mechanism 71 for driving the rear wheel 39.

An upper arm 74 and a lower arm 75 are disposed on the rear part 37r of the arm body 37 set apart in the vertical direction, and the reduction gear unit 72 is disposed between the upper arm 74 and the lower arm 75. The reduction gear unit 72 is covered by a reduction gear case 76.

An edge part 76f of the reduction gear case 76 is fastened to the arm body 37 by a plurality of fastening members 78 extending along the width direction of the motorcycle.

Force that is applied to the reduction gear case 76 can be directly transmitted to the arm body 37 because the edge part 76f of the reduction gear case 76 that covers the reduction gear unit 72 is fastened to the arm body 37 via the fastening members 78. Since the reduction gear case 76 is directly fastened to the arm body 37, the arm body 37 acts to reinforce the reduction gear case 76. Accordingly, it is possible to reduce the necessary rigidity of the reduction gear case 76. Reducing the rigidity of the reduction gear case 76 makes it possible to reduce the thickness of the reduction gear case 76. The weight of the reduction gear unit 72 can therefore be reduced.

As shown in FIG. 4, the reduction gear unit 72 does not need to protrude from the arm body 37 because the reduction gear unit 72 is disposed between the upper arm 74 and the lower arm 75. As a result, the reduction gear unit 72 is disposed within the arm body 37, as seen when the motorcycle 10 is viewed from above, and it is possible to prevent an increase in the width of the motorcycle 10. Therefore, it is possible to make the motorcycle 10 more compact.

The action of the structure of the rear parts of the motorcycle 10 described above will be described with reference to FIGS. 6A and 6B and FIGS. 7A and 7B.

Figure 6A:
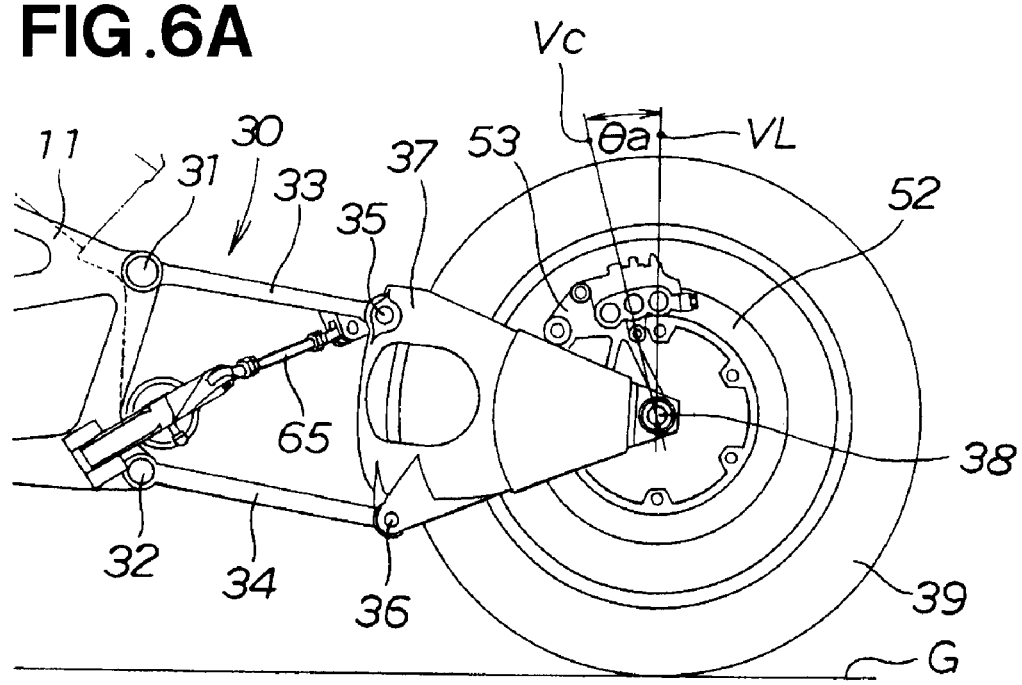
FIGS. 6A and 6B are schematic views illustrating an operation asn an upward force is not acting on the rear wheel.

When the rear wheel 39 is not being subjected to force from the road surface, the arm members 33, 34 extend downward and to the right from the pivot shafts 31, 32, as shown in FIG. 6A. An angle is formed by a line V that is plumb with the road surface, and a line Vc that extends from the rear wheel axle 38 and passes through the center of the rear wheel disc caliper 53. This angle is designated as θa.

Figure 6B:
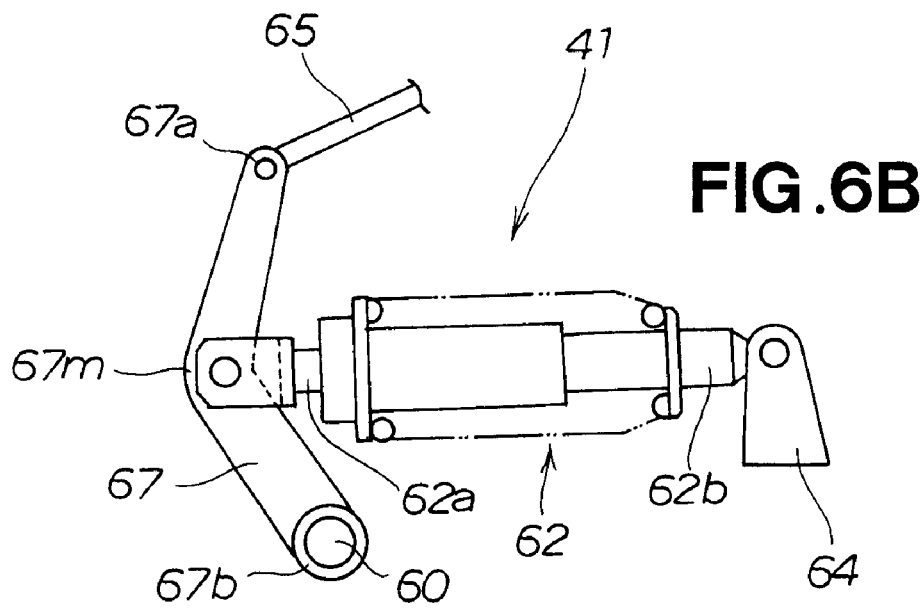

As shown in FIG. 6B, the rear part cushioning mechanism 41 has a rear cushioning bracket 64 and a support shaft 60 that are provided to the motorcycle body frame; a substantially L-shaped rear link 67 that is swingably provided to the support shaft 60; and the lower part cushioning unit 62, which extends from a middle portion 67m of the rear link 67 and which is connected to the rear cushioning bracket 64. Specifically, a first end 62a of the rear part cushioning unit 62 is attached to the middle portion 67m of the rear link 67, and a second end 62b of the rear part cushioning unit 62 is attached to the rear cushioning bracket 64. A second end 67b that constitutes the base of the rear link 67 is attached to the support shaft 60; and a first end 67a that constitutes a distal end of the rear link 67 is attached to the rod member 65.

In the state shown in FIG. 6A, force is not being applied to the rod member 65 shown in FIG. 6B. As a result, the rear part cushioning unit 62 is not compressed and is in an extended state.

Figure 7A:
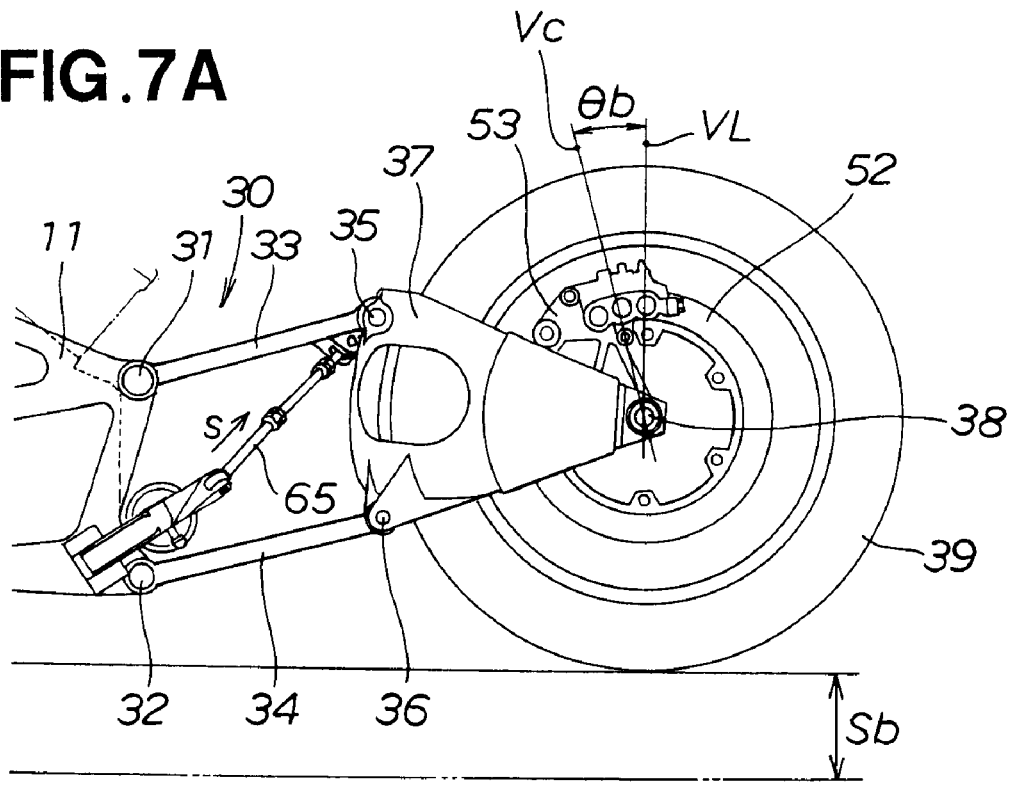
FIGS. 7A and 7B are schematic views illustrating an operation as an upward force is acting on the rear wheel.

As shown in FIG. 7A, when the rear wheel 39 is subjected to force from the road surface, the rear wheel 39 will be raised a distance of Sb from the original position, upward force will be applied to the arm body 37, and the arm members 33, 34 will rotate around the pivot shafts 31, 32 in the counterclockwise direction relative to the plane of the drawing. In this case, force is applied to the rod member 65 in the direction of the arrow s. The angle formed by the line VL and the line VC is designated as θb.

Since the arm members 33, 34 are parallel, the arm body 37 moves in the vertical direction without changing or substantially changing its orientation due to a so-called parallel link effect. Specifically θa=θb, or θa≈θb. Accordingly, the orientation of the rear wheel disc caliper 53 does not change with respect to the road surface. Since the orientation does not change, brake squeal can be minimized.

Figure 7B:
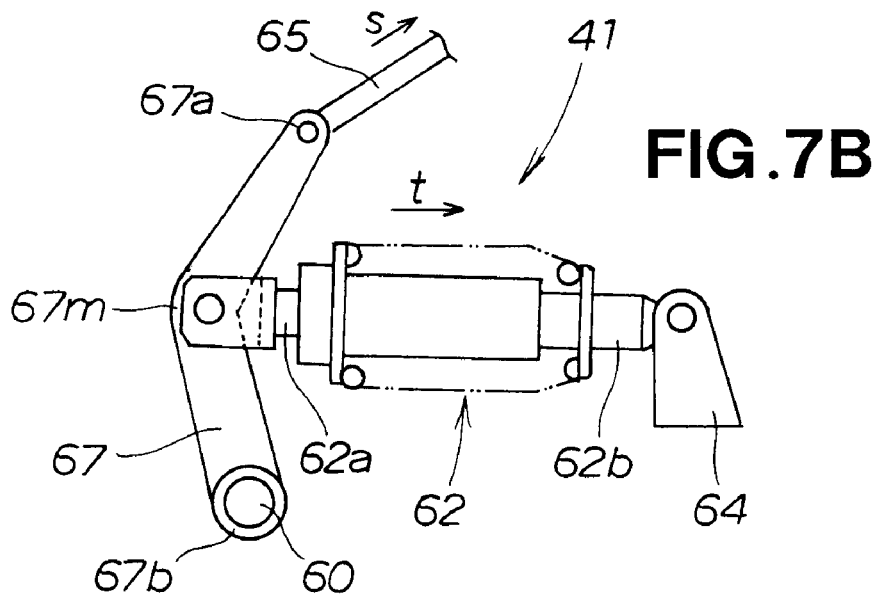

As shown in FIG. 7B, in this case, force is applied to the rod member 65 in the direction of the arrow s, and force that urges the rear part cushioning unit 62 to retract in the direction of the arrow t is applied to the rear part cushioning unit 62 via the rear link 67.

A modification will be described below.

First, the manner in which the layout of the rear part cushioning unit 62 can be freely modified will be described.

As shown in FIG. 8, a concave part 82 that opens toward the rear is provided to a rear part of a vehicle frame 11C. The rear part cushioning unit 62 is housed in the concave part 82. The length of the rod member 65 must be modified, and the rear part cushioning unit 62 can be positioned further forward than the upper and lower pivot shafts 31, 32. It is also possible to shorten the upper arm 33L and the lower arm 34L without changing the position of the rear part cushioning unit 62. A space can thus be provided between the upper arm 33L and the lower arm 34L. The rear part cushioning unit 62 can therefore be freely positioned forward or rearward of the pivot shafts 31, 32. A space able to accommodate a rear part cushioning unit 62 of a size that corresponds to the necessary stroke is readily maintained between the motorcycle frame 11C and the arm body 37, and the rear part cushioning unit 62 can be disposed in this space.

A structure that differs from that of FIG. 4 is presented below. This structure will be described in detail with reference to FIG. 9, with a major point of difference relative to the structure of FIG. 4 being that two left and right rear links are provided, and two left and right rod members are provided.

Figure 9:
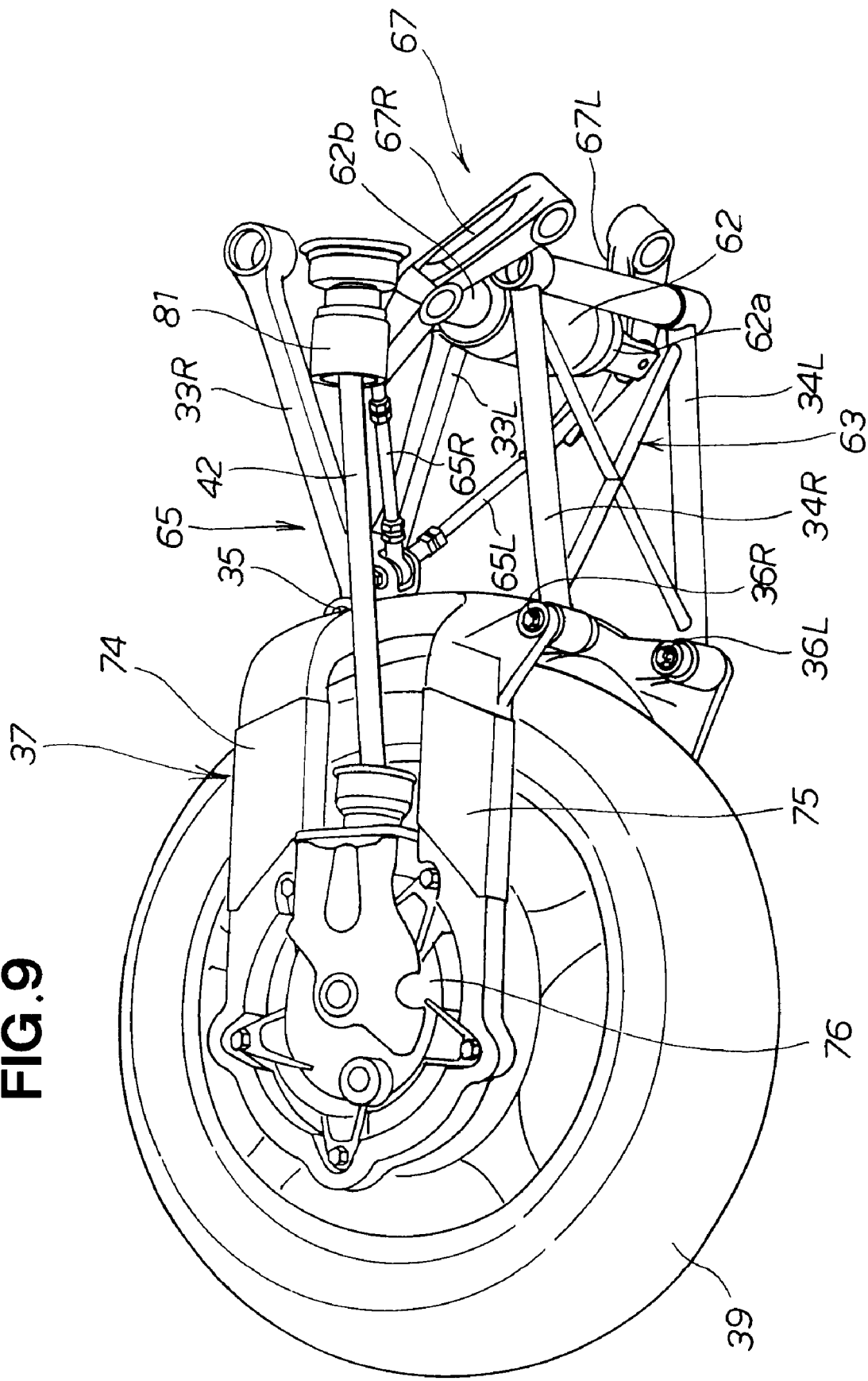
FIG. 9 is a perspective view illustrating a separate embodiment of the motorcycle rear part shown in FIG. 4.

Specifically, as shown in FIG. 9, the rod member 65 has a left rod member 65L and a right rod member 65R. The rear link 67 has a left rear link 67L and a right rear link 67R. The left rod member 65L is connected to the first end 62a of the rear part cushioning unit 62 via the left rear link 67L. The right rod member 65R is connected to the second end 62b of the rear part cushioning unit 62 via the right rear link 67R.

The left and right rod members 65L, 65R are subjected to force that is transmitted by the arm parts 33L, 33R. The left and right rod members 65L, 65R then transmit force to the first and second ends 62a, 62b of the rear part cushioning unit 62. Specifically, force is distributed to the left and right and is transmitted to the rear part cushioning unit 62. Accordingly, force applied to the rear wheel 39 can be transmitted to and absorbed by the rear part cushioning unit 62 in a properly balanced manner.

Figure 10:
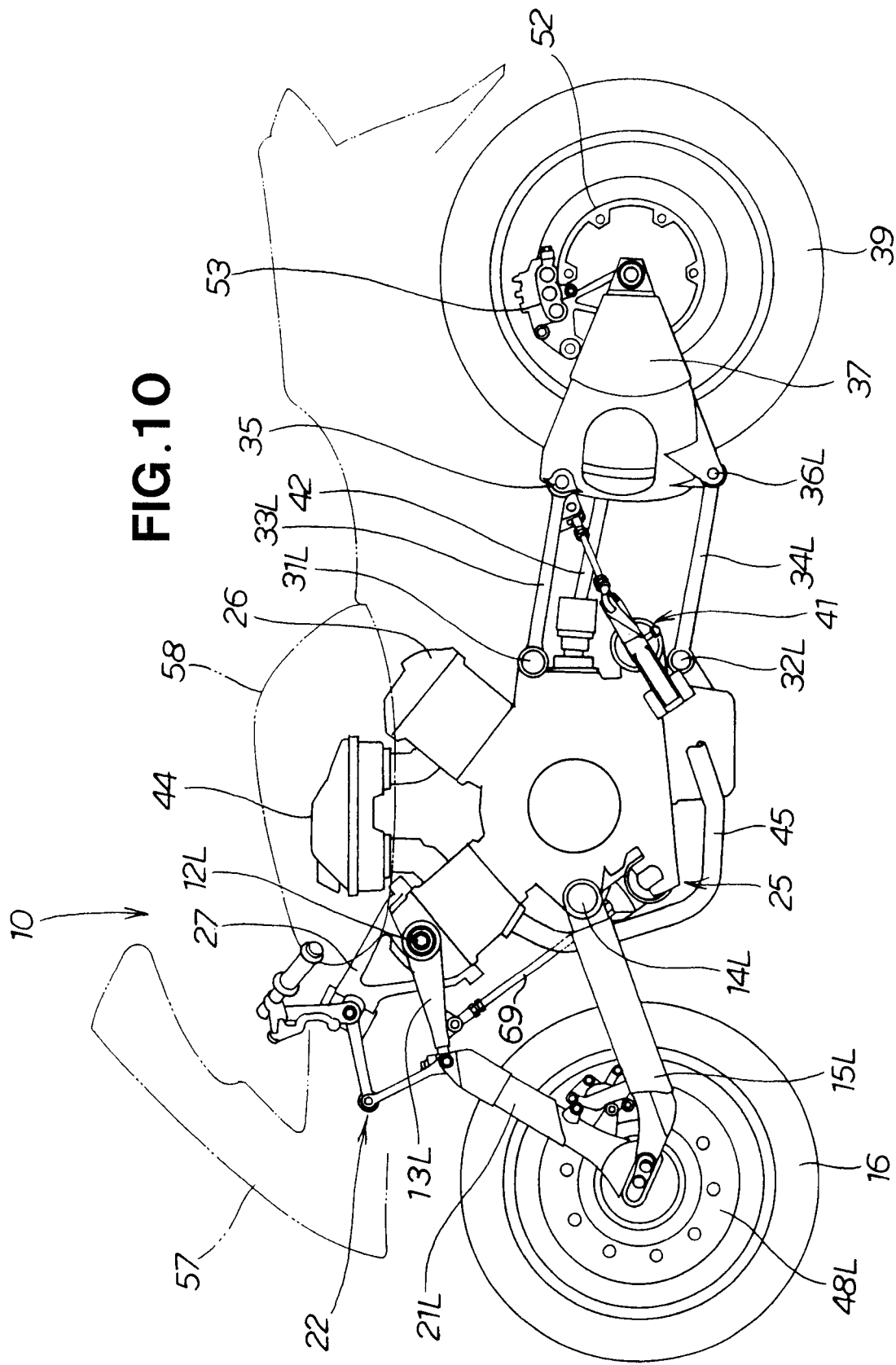
FIG. 10 is a side elevational view illustrating a separate embodiment of the motorcycle of FIG. 1.
Figure 11A:
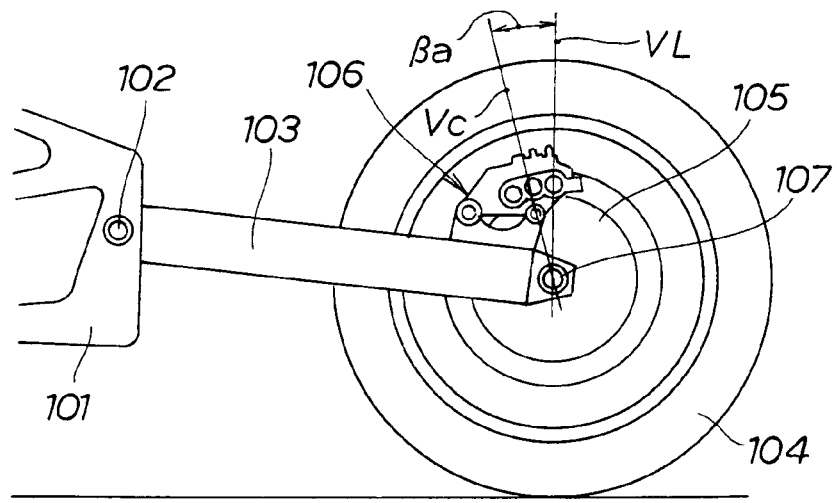
FIGS. 11A to 11C are schematic views illustrating a relationship between a rear swing arm and a caliper in a prior art motorcycle.
Figure 11B:
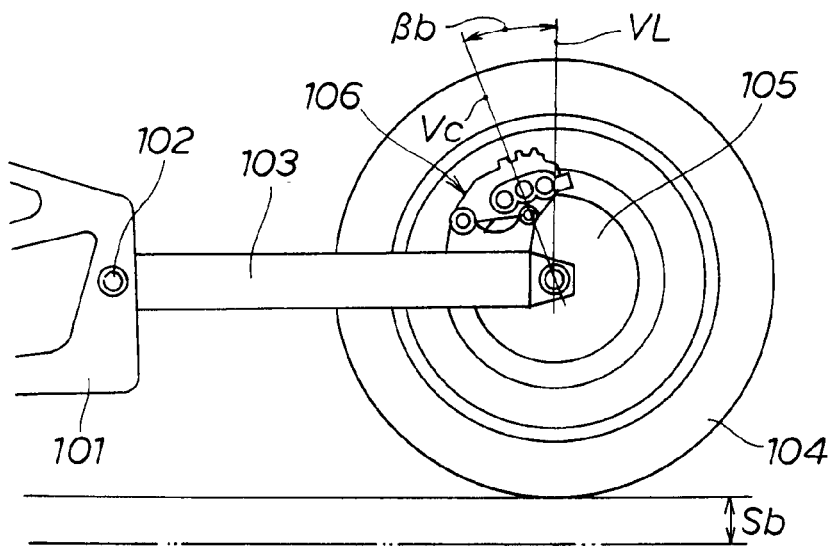
Figure 11C:
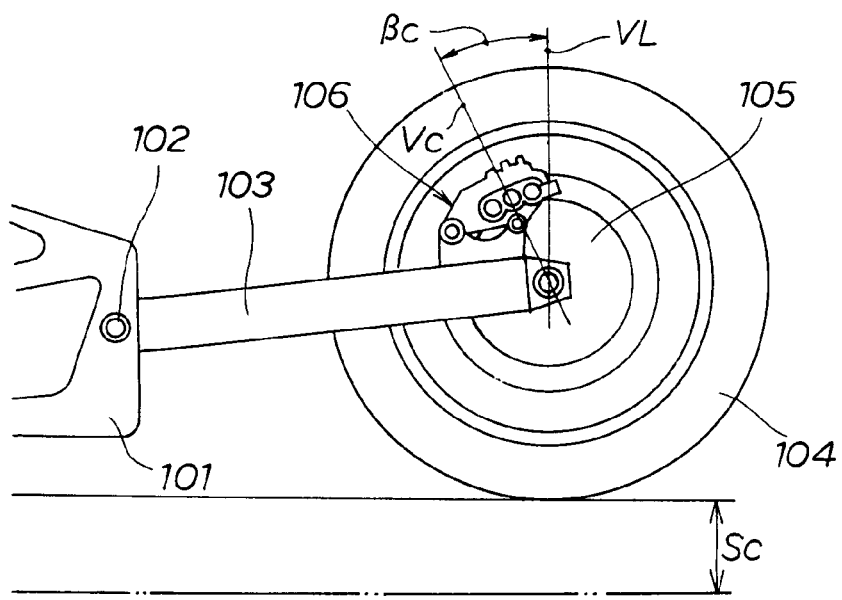

A structure that differs from FIG. 1 is presented below. As shown in FIG. 10, the main frame is omitted, and the upper arm 13L and the lower arm 15L are directly connected a front part of the engine 26. The arm members 33L, 34L are directly connected to a rear part of the engine 26. Providing the engine 26 with a main frame function allows the weight of the motorcycle 10 to be reduced.

Obviously, various minor changes and modifications of the present invention are possible in light of the above teaching.

It is therefore to be understood that within the scope of the appended claims the invention may be practiced otherwise than as specifically described.

What is claimed is:

1. A motorcycle comprising:
   a body frame;
   an engine carried on the body frame;
   a rear swing arm extending from one of the body frame and the engine;
   a rear wheel supported by the rear swing arm; and
   a drive mechanism for transmitting a drive force from the engine to the rear wheel,
   wherein the rear swing arm comprises:
   upper arms and lower arms vertically swingably attached to one of the body frame and the engine via pivot shafts, the upper arms and lower arms extending toward the rear wheel and being parallel and in vertically spaced relation to each other; and
   an arm body swingably connected to a rear end of the upper and lower arms via support shafts for supporting the rear wheel, the arm body being in the form of a U shape as viewed in top plan and surrounding a front portion of the rear wheel.

2. The motorcycle of claim 1, wherein the drive mechanism includes: a drive shaft for transmitting a drive force to the rear wheel; and a reduction gear unit with a reduction gear case for covering the reduction gear unit, the reduction gear case having an edge part attached to the arm body by a plurality of fastening members extending transversely of the motorcycle.

3. The motorcycle of claim 2, wherein the arm body has an upper frame part and a lower frame part provided in vertically spaced relation to each other, and the reduction gear unit is disposed between the upper frame part and the lower frame part.

* * * * *